United States Patent
Hutchinson

(10) Patent No.: US 10,054,699 B1
(45) Date of Patent: Aug. 21, 2018

(54) METHOD AND APPARATUS FOR GENERATING SHEAR WAVES USABLE IN DETERMINING DISTRIBUTION AND ORIENTATION OF GEOLOGIC FEATURES IN THE SUBSURFACE AMONG OTHER USES

(71) Applicant: Peter J. Hutchinson, Murrysville, PA (US)

(72) Inventor: Peter J. Hutchinson, Murrysville, PA (US)

( * ) Notice: Subject to any disclaimer, the term of this patent is extended or adjusted under 35 U.S.C. 154(b) by 174 days.

(21) Appl. No.: 15/086,287

(22) Filed: Mar. 31, 2016

Related U.S. Application Data

(60) Provisional application No. 62/141,619, filed on Apr. 1, 2015.

(51) Int. Cl.
  *G01V 1/145* (2006.01)
  *G01V 1/047* (2006.01)
  *G01V 1/143* (2006.01)

(52) U.S. Cl.
  CPC .............. *G01V 1/145* (2013.01); *G01V 1/047* (2013.01); *G01V 1/143* (2013.01)

(58) Field of Classification Search
  CPC ........ G01V 1/047; G01V 1/143; G01V 1/147; G01V 1/284

USPC ............................ 367/75; 181/113, 114, 121
See application file for complete search history.

(56) References Cited

U.S. PATENT DOCUMENTS

| | | | | |
|---|---|---|---|---|
| 2,910,134 | A * | 10/1959 | Crawford | G01V 1/047 181/121 |
| 4,118,994 | A * | 10/1978 | Layotte | G01V 1/053 181/121 |
| 4,301,888 | A * | 11/1981 | Gibson | G01H 11/00 181/114 |
| 4,980,874 | A | 12/1990 | Justice, Jr. | |
| 6,065,562 | A | 5/2000 | Bird et al. | |
| 6,119,804 | A * | 9/2000 | Owen | G01V 1/047 181/113 |
| 7,395,897 | B2 | 7/2008 | Gilmer et al. | |
| 8,061,471 | B2 | 11/2011 | Wei | |
| 8,807,266 | B1 * | 8/2014 | Gomez | G01V 1/09 181/114 |
| 2006/0118353 | A1 * | 6/2006 | Quinn | G01V 1/143 181/121 |

* cited by examiner

*Primary Examiner* — Ian J Lobo
(74) *Attorney, Agent, or Firm* — Nils H. Ljungman & Associates

(57) ABSTRACT

Apparatus for generating shear waves usable in determining shear waves usable in determining distribution and orientation of geologic features in the subsurface among other uses, having a hammer bar with a rod connected to a center position of the hammer bar and having a coil spring therewith and two magnets on each side of the rod to hold the hammer bar in a position to strike the anvil bar.

8 Claims, 6 Drawing Sheets

METHOD AND APPARATUS FOR GENERATING SHEAR WAVES USABLE IN DETERMINING DISTRIBUTION AND ORIENTATION OF GEOLOGIC FEATURES IN THE SUBSURFACE AMONG OTHER USES

CONTINUING APPLICATION DATA

The present application claims benefit of U.S. Provisional Patent Application No. 62/141,619, filed on Apr. 1, 2015.

BACKGROUND

1. Technical Field

The present application relates to an anvil shear wave generator.

2. Background Information

Background information is for informational purposes only and does not necessarily admit that subsequently mentioned information and publications are prior art.

The present patent application relates to a seismic energy source configured to generate shear wave energy in order to more accurately determine the distribution and orientation of fractures and other features in the subsurface among other uses.

The present application is intended to be used as a shear wave seismic source during the collection of seismic profiles where at least one goal of the survey may be to determine shear wave velocity with depth. The device will produce a clean, repeatable shear wave for this land-based application. Its portable design makes it extremely practical for surveys where space is limited.

SUMMARY

The Anvil Shear Wave Generator (ASWG) may comprise: two strong electromagnets; one strong spring; one thick iron plate as the travelling hammer bar; one thick iron plate as the stricken bar or anvil; two alignment rods to guide the hammer plate during travel; one lever to set the electromagnetically-held hammer bar; one twelve-volt battery to energize the electromagnets; one ramp to position front wheel of a truck on top of the device for coupling the device to the ground; one trigger switch—an open electrical connection that completes the circuit when it detects the initial impact of the hammer bar striking the anvil bar (a spring-operated device that converts motion into digital impulses), thus starting the seismograph to record; and one tri-axial geophone to be placed into a borehole at a predetermined depth or for land-based seismic profiles.

For borehole application, the geophone is held in position through a spring bar that forces the geophone to be held against the bore hole wall. The triaxial geophone comprises: one vertically-oriented spring sensor to convert vertical (compressional) motion to an electrical impulse; two horizontally-oriented spring sensors to convert horizontal (shear) motion to an electrical impulse in two orthogonal directions; one seismograph that converts geophone electrical impulses to digital data based on the strength of the electrical impulse or amplitude; and one PC laptop computer to record the digital signal from the seismograph.

The ASWG comprises a steel lever arm, two electromagnets, two steel plates, a 12V battery, electrical switch, and steel ramp/platform. It couples to the ground surface by the weight of a pickup truck that rests on the steel ramp/platform. The wheel of a vehicle is driven up the ramp to rest on the platform that overlies the ASWG and provides the needed or desired weight to couple the ASWG to the ground. The truck should be positioned on the ramp so that the lever arm is accessible with enough room to pull it outward and away from the vehicle's front tire.

The ASWG is equipped with a steel lever that latches to the hammer bar. The hammer bar is pulled away from the anvil bar, thus collapsing the spring that forces it to strike the anvil bar. The hammer bar is placed into contact with the activated electromagnets that hold the hammer bar in place. The electromagnets are activated through a 12V battery. Upon deactivation of the electromagnet circuit, via the electrical switch, the hammer bar is forced by the elastic recoil of the spring to hit the anvil bar and initiate a clean, repeatable shear wave.

The ASWG initiates a propagating shear wave train into the subsurface for the purpose of collecting shear wave velocities with depth or the surface. For borehole shearwave velocity measurement, the device is positioned on the ground surface alongside a borehole containing a triaxial geophone placed at a known depth within the borehole. The geophone is held against the borehole with a motor-operated spring bar. Depths are predetermined at equal intervals depending on survey requirements. The geophone is connected to a seismograph that converts the physical movement of the geophone sensors into an electrical signal. The electric signal is converted to digital data for recording. The ASWG has a trigger switch attached to the anvil bar. The instant the anvil bar is struck by the hammer bar, the trigger switch makes electrical contact and starts the seismograph to record, without delay, the shear wave energy as it impacts the geophone. The seismograph is connected to a laptop where the digital data is displayed and saved.

Once the data has been recorded, the file can be opened in a seismic processing program to display the shot gather for picking the shear wave first arrival time. The clean and consistent energy imparted by the ASWG allows for easier picking of the first arrival time of the advancing shear wave train by the geophone.

The first arrival time is picked by deciding which curve of the wiggle trace is the shear wave. Compressional waves arrive faster and may contaminate the shot gather before the shear wave arrives. The user should use caution picking these faster arrival times as they are likely compressional waves.

Two of these units can be deployed by positioning the levers facing opposite directions of one another; one beneath each front tire of the pickup truck. This setup ensures that two records can be collected in both positive and negative polarities.

Shear wave velocity data is used to describe the stiffness of the subsurface. It is used in geotechnical studies for structural foundation design. Low shear wave velocities generally indicate looser, less cohesive soils while high shear wave velocities usually refer to stiffer material. If the compressional wave velocity is also known, Poisson's ratio, and various moduli can be calculated.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
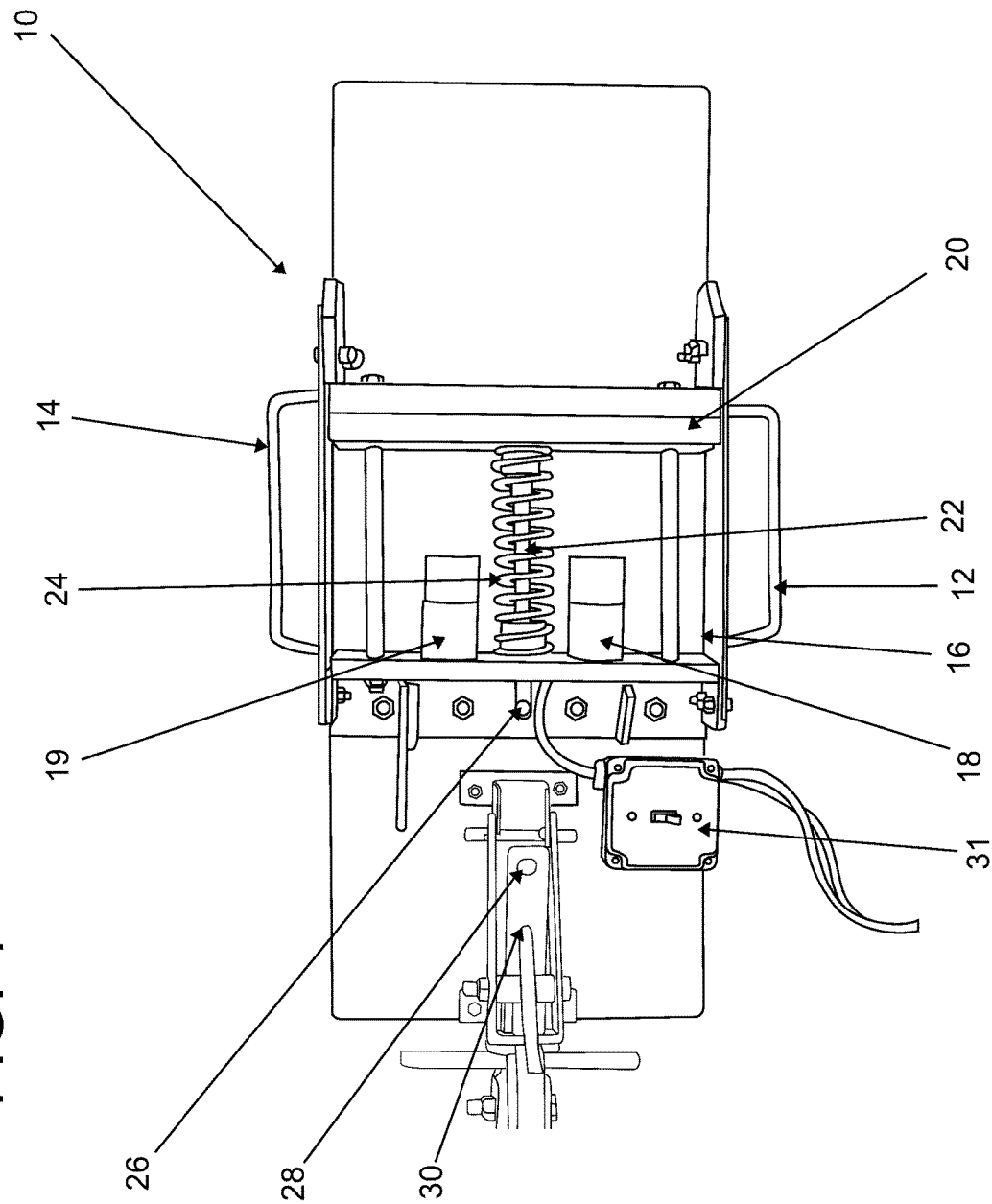
FIG. 1 shows a shear wave generating device.

A shear wave generating device 10 is shown in FIG. 1. In this Figure, the shear wave device 10 is shown in its non-activated state. There are two handles 12 and 14, one on each side of the shear wave generating apparatus 10 to permit the apparatus 10 to be carried. There is a plate 16 at the bottom of the apparatus 10, which permits the connection of the shear wave generating device 10 to the ground, which allows for the transmission of shear waves through the ground. An iron or steel travelling hammer bar 20 is shown in its disengaged position. A rod 22 is connected to the magnetic bar 20 and is held in its disengaged position by a spring 24, which spring 24 pushes the iron bar 20 into its disengaged position. The rod 22 connected to the iron bar 20 has a bend 26 at the end of the rod 22, which is distal from the bar 20. The bend 26 points upwardly from the plate 16. The bend 26 is configured to engage with a hole 28 in a portion of an elongated plate member 30 and pulls rod 22 into the engaged position and ready to generate a shear wave. Upon the travelling hammer bar 20 being in contact with the magnets 18 and 19, a switch 31 is moved to the on position to energize the electromagnets 18 and 19 and hold the travelling hammer bar 20 in place.

Figure 2:
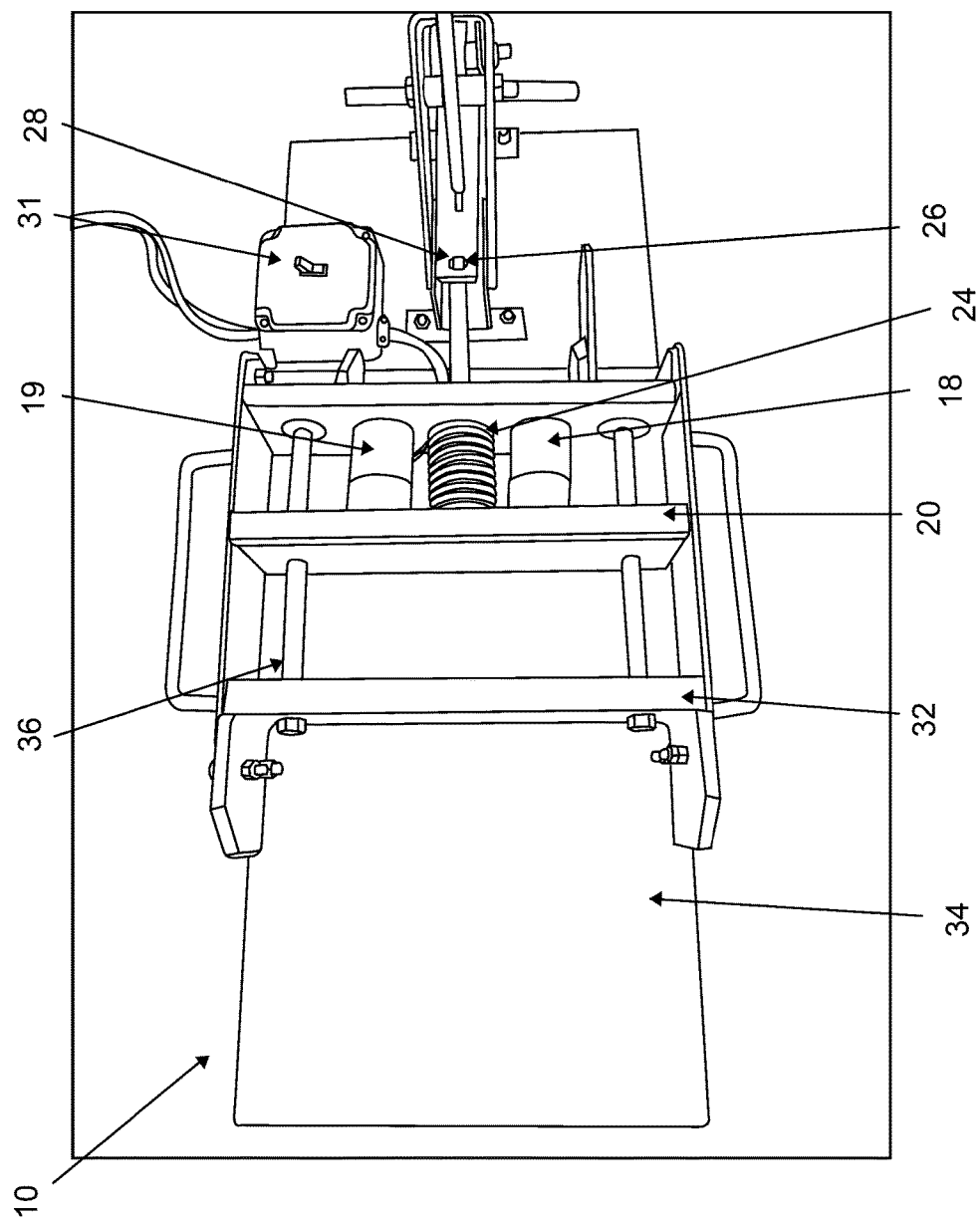
FIG. 2 also shows a shear wave generating device.

FIG. 2, an end view, shows the travelling hammer bar 20 engaged with the electromagnets 18 and 19. The spring 24 is compressed. The switch 31 is turned on to hold the hammer bar 20 in the engaged position. The hole 28 is then disengaged from the bend 26 of the rod 22. The shear wave apparatus 10 is now ready to generate a shear wave. A ramp (not shown) is placed upon the anvil shear wave generator and a truck is then driven over the top of the anvil shear wave generator 10. The truck couples the shear wave generating apparatus 10 to the ground so that a wave, generated by the shear wave generating apparatus 10, will be transmitted into the ground as fully as the shear wave generating apparatus 10 is capable. When the wheel of the truck is parked appropriately on the plate 34, the switch 31 is switched from its connected electrical position to its disconnected electrical position. The hammer bar 20 is no longer held by the electromagnets 18 and 19, and therefore the spring 24 pushes the bar 20 away from the electromagnets 18 and 19 such that the bar 20 strikes anvil bar 32 on the frame 36 of the shear wave generating apparatus 10. This strike on the anvil bar 32 by the hammer bar 20 generates a substantial shear wave that is coupled to the ground by the weight of the wheel of the truck standing on the ramp that rests on the shear wave generating apparatus 10.

Figure 3:
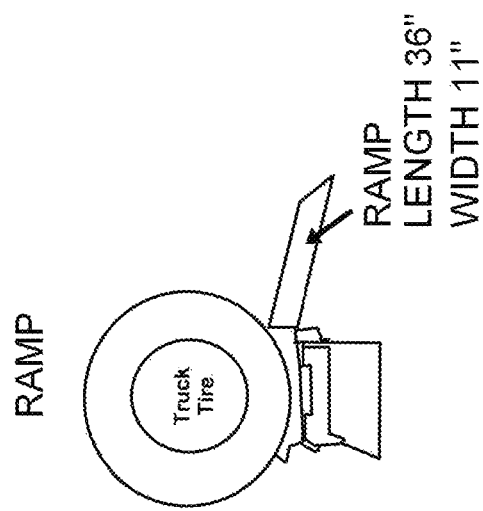
FIG. 3 shows a tire pressing down on the shear wave generating device.

FIG. 3 shows the truck tire pressing down on the shear wave generating apparatus 10.

Figure 4:
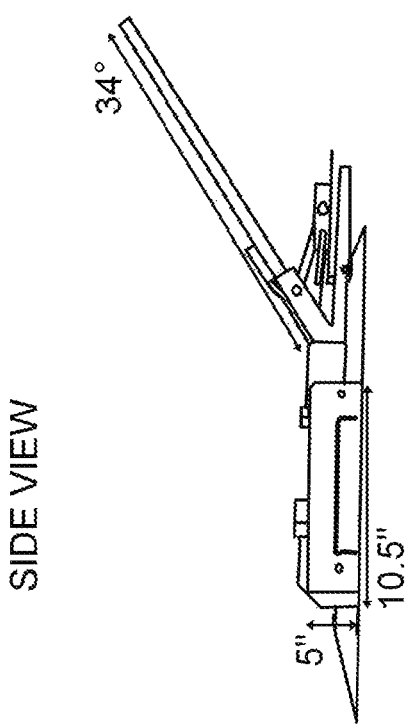
FIG. 4 shows a side view of the shear wave generating device.

FIG. 4 shows a side view of the shear wave generating apparatus 10 with a ramp connected to the shear wave generating apparatus 10 to permit easier access for the truck wheel to mount the shear wave generating apparatus 10.

Figure 5:
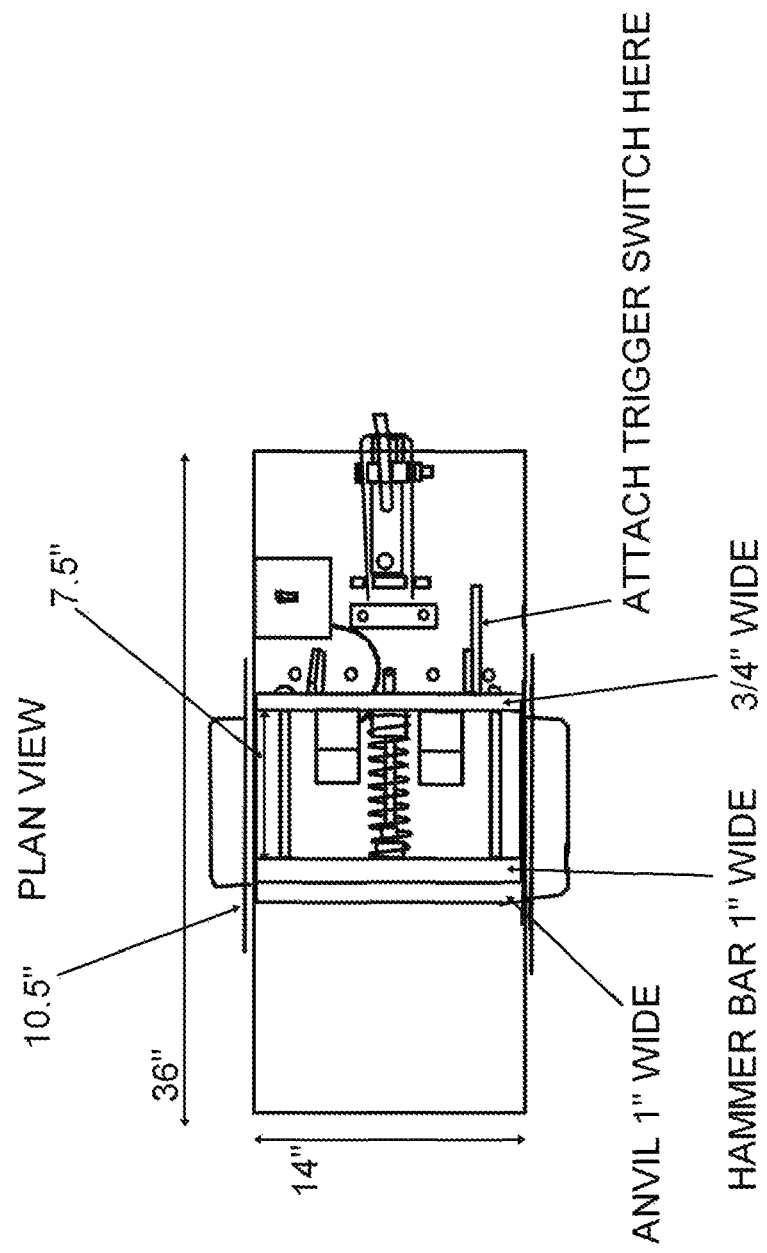
FIG. 5 shows a top view of the shear wave generating device.

FIG. 5 shows a diagrammatic top view or plan view of the shear wave generating apparatus 10.

Figure 6:
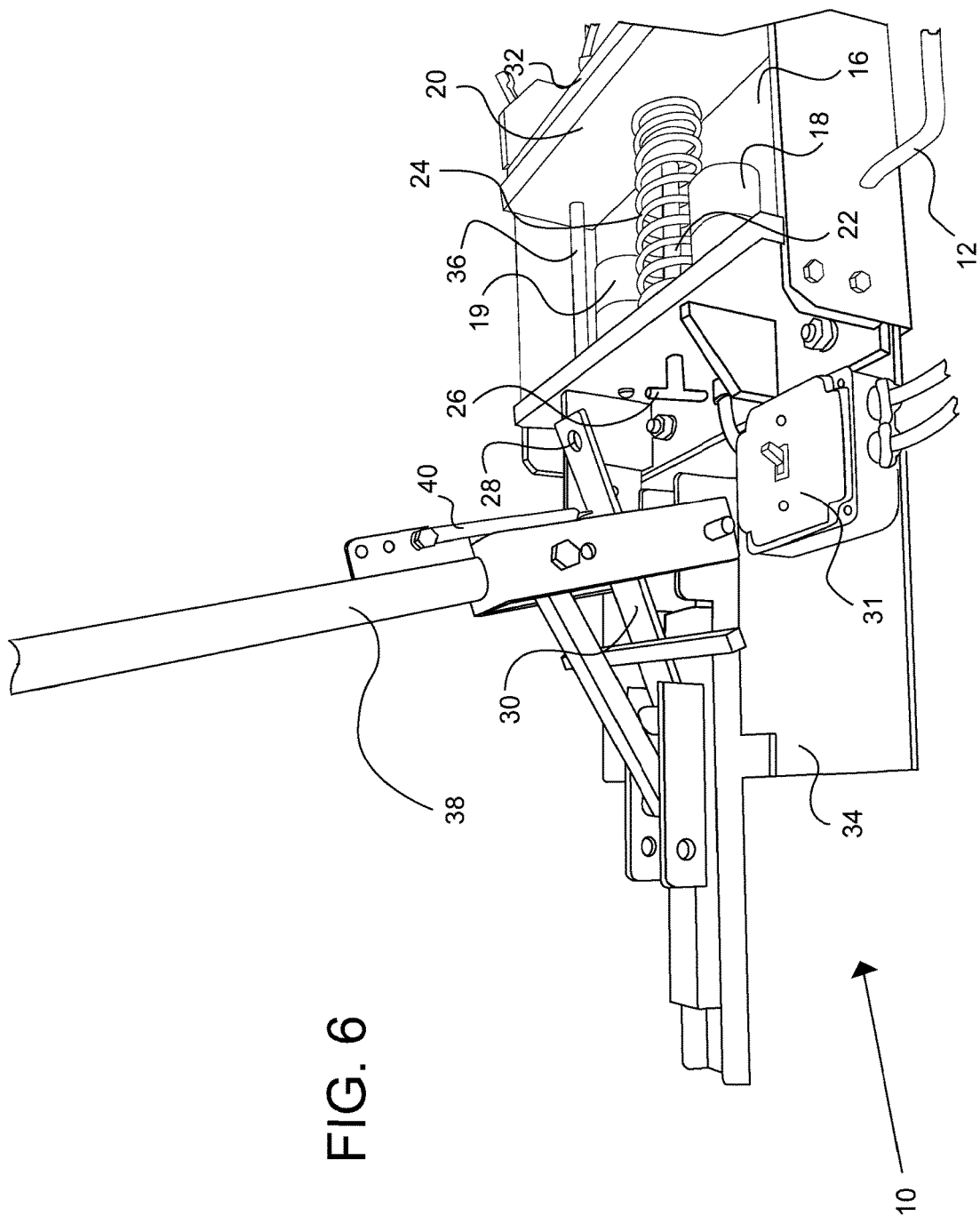
FIG. 6 shows a perspective view of a portion of the shear wave generating device.

FIG. 6 shows a perspective view of a portion of the shear wave generating device 10.

To use the device 10, a person or persons may lift the device 10 by the device handles 12 and 14 and then place the device 10 on the ground. A person may then drive a vehicle, or a portion of a vehicle like a vehicle tire, on top of the plate 34.

Once the vehicle or portion of the vehicle is on top of the plate 34, a person can then put the device 10 in a ready-to-strike position. In the ready-to-strike position, the hammer bar 20 is held in place by the electromagnets or solenoids 18 and 19 in a position away from the anvil bar 32.

To place the device 10 in the ready-to-strike position, the bend or hook member 26 of the rod 22 is inserted into the hole 28 of the elongated plate member or engaging member 30. Once the hook 26 is engaged in the hole 28, the long handle 38 is moved to the left in FIG. 6. The long handle 38 moves the hole 28 on the plate member 30 and thereby also pulls the hook 26 and the rod 22 toward the electromagnets 18 and 19, thereby moving the hammer bar 20 toward the electromagnets 18 and 19 and away from the anvil bar 32.

The electromagnets 18 and 19 are then previously energized by flipping the switch 31 to an ON position. The electromagnets, once activated, then hold the hammer bar 20 in place away from the anvil bar 32.

Once the hammer bar 20 is being actively held in the ready-to-strike position by the electromagnets 18 and 19, the hook 26 is then removed from the hole 28 by releasing the force on the elongated plate member 30 or pushing the hole 28 slightly to the right. The coil spring 40 then lifts the plate 30 to disengage the hook 26 from the hole 28. The hammer bar 20 is held in position by the activated electromagnets 18 and 19. The device 10 is now in the ready-to-strike position.

Once the device 10 is in the ready-to-strike position, the electromagnets 18 and 19 may be deactivated to release the hammer bar 20 by using the switch 31 to turn off the power to the electromagnets 18 and 19. The coil spring 24 then expands and moves the hammer bar 20 toward the anvil bar 32. The hammer bar 20 strikes the anvil bar 32. The strike creates a shear wave that is directed into the ground via the plate 34.

One feature or aspect of an exemplification is believed at the time of the filing of this patent application to possibly reside broadly in a method of generating shear waves, with a compact, portable unit 10, through the ground and determining distribution and orientation of geologic subsurface earth features using the wave-generating unit 10, said unit 10 comprising: a compact, portable body 36 being sufficiently light to be transported by being carried by one person or two persons; handles 12 and 14 connected to said body 36 and being disposed to permit transport by one person or two persons; a hammer bar 20 disposed to strike an anvil bar 32 both being disposed in said body 36; said anvil bar 32, in said body 36, being disposed to be struck by said hammer bar 20; a coil spring 24 operatively connected to said hammer bar 20 and configured to move said hammer bar 20, in a direction substantially parallel to the surface of the ground on which said body 36 is to rest, to strike said anvil bar 32 and generate a shear wave substantially parallel to the surface of the ground on which said body 36 rests; an engaging device 30 configured to pull and compress said spring 24 and move said hammer bar 20 into a position ready to strike said anvil bar 32; holding apparatus 18 and 19 to hold said hammer bar 20 in a position ready to strike said anvil bar 32; releasing apparatus 18 and 19 to release said hammer bar 20 and permit movement of said hammer bar 20 substantially parallel to the surface of the ground, on which said body 36 is to rest, and striking said anvil bar 32 in a direction substantially parallel to the surface of the ground on which said body 36 is to rest; a plate 34 attached to said body 36 configured to permit a portion of a vehicle, such as a truck tire, to hold said body 36 into firm contact with the ground and permit transfer of the generated energy from said body 36 into the ground upon said vehicle portion being disposed on said plate 34; and said method comprising the steps of: placing said body 36, by one person or two persons, on the ground permitting a direction of movement upon release of the hammer bar 20 substantially parallel to the surface of the ground, on which said body 36 is resting, where the distribution and orientation of geologic subsurface features are being determined; driving said vehicle portion onto said plate 34 and holding and pressing said body 36 in firm contact with the ground on which said body 36 is located permitting transfer of the shear wave generated by said wave-generating unit 10 to the ground; compressing said coil spring 24 and moving said hammer bar 20 away from contact with said anvil bar 32 and into a position ready to strike said anvil bar 32; releasing said hammer bar 20 and moving said hammer bar 20 substantially parallel to the surface of the ground; striking said anvil bar 32 and generating a wave through said body 10 and generating a shear wave in the ground substantially parallel to the surface of the ground and into the ground substantially parallel to the surface of the ground on which said body 10 is placed.

Another feature or aspect of an exemplification is believed at the time of the filing of this patent application to possibly reside broadly in a method of generating shear waves, with a compact, portable unit 10, through the ground and determining distribution and orientation of geologic features in subsurface in earth using the wave-generating unit 10, said unit 10 comprising: a compact, portable body 36 being sufficiently light to be transported by being carried by one person or two persons; handles 12 and 14 connected to said body 36 and being disposed to permit transport by one person or two persons; a hammer bar 20 disposed to strike an anvil bar 32 both being disposed in said body 36; said anvil bar 32, in said body 36, being disposed to be struck by said hammer bar 20; a coil spring 24 operatively connected to said hammer bar 20 and configured to move said hammer bar 20, in a direction substantially parallel to the surface of the ground on which said body 36 is to rest, to strike said anvil bar 32 and generate a shear wave substantially parallel to the surface of the ground on which said body 36 rests; an engaging device 30 configured to pull and compress said spring 24 and move said hammer bar 20 into a position ready to strike said anvil bar 32; holding apparatus 18 and 19, comprising an electromagnet, to hold said hammer bar 20 in a position ready to strike said anvil bar 32; said electromagnet 18 and 19 configured to release said hammer bar 20 and permitting movement of said hammer bar 20 substantially parallel to the surface of the ground, on which said body 36 is to rest, and striking said anvil bar 32 in a direction substantially parallel to the surface of the ground on which said body 36 is to rest; a rod 22 connected to said hammer bar 20 being configured to permit said hammer bar 20 from being withdrawn from a position ready to release said hammer bar 20 to strike said anvil bar 32; said rod 30 comprising a hole 28 configured to receive a hook member 26 of said engaging device 22 and permit said engaging device 30 to pull said hammer bar 20 into the position ready to strike said anvil bar 32; said releasing apparatus 40 being configured to release said hook member 26 from said hole 28 in said rod 30 and permit said hammer bar 20 to move and strike said anvil bar 32; a plate 34 attached to said body 36 configured to permit a portion of a vehicle, such as a truck tire, to hold said body 36 into firm contact with the ground and permit transfer of the generated wave from said body 36 into the ground upon said vehicle portion being disposed on said plate 34; and said method comprising the steps of: placing said body 36, by one person or two persons, on the ground permitting a direction of movement upon release of the hammer bar 20 substantially parallel to the surface of the ground, on which said body 36 is resting, where the distribution and orientation of subsurface features are being determined; driving said vehicle portion onto said plate 34 and holding and pressing said body 36 in firm contact with the ground on which said body 36 is located permitting transfer of the wave generated by said wave-generating unit 10 to the ground; pulling back said rod 22; compressing said coil spring 24 and moving said hammer bar 20 away from contact with said anvil bar 32 and into a position ready to strike said anvil bar 32; engaging a hole 28 of said engaging device 30 with said hook 26 of said rod 22 and setting the hammer bar 20; holding said hammer bar 20 in a position ready to strike said anvil bar 32 with said electromagnetic holding apparatus 18 and 19 and holding said hammer bar 20 in a position ready to strike said anvil bar 32; releasing said hammer bar 20 by turning off said electromagnetic holding apparatus 18 and 19; moving said hammer bar 20 substantially parallel to the surface of the ground; striking said anvil bar 32 and generating a wave through said body 36 and generating a shear wave in the ground substantially parallel to the surface of the ground and into the ground substantially parallel to the surface of the ground on which said body 36 is placed.

Yet another feature or aspect of an exemplification is believed at the time of the filing of this patent application to possibly reside broadly in a method of generating shear waves, with a compact, portable unit 10, through the ground and determining distribution and orientation of geologic features in subsurface earth features using the wave-generating unit 10, said unit 10 comprising: a compact, portable body 36 being sufficiently light to be transported by being carried by one person or two persons; handles 12 and 14 connected to said body and being disposed to permit transport by one person or two persons; a hammer bar 20 disposed to strike an anvil bar 32 both being disposed in said body 36; said anvil bar 32, in said body 36, being disposed to be struck by said hammer bar 20; a coil spring 24 operatively connected to said hammer bar 20 and configured to move said hammer bar 20, in a direction substantially parallel to the surface of the ground on which said body 36 is to rest, to strike said anvil bar 32 and generate a shear wave substantially parallel to the surface of the ground on which said body 36 rests; an engaging device 30 configured to pull and compress said spring 24 and move said hammer bar 20 into a position ready to strike said anvil bar 32; holding apparatus 18 and 19 comprising an electromagnet configured to hold said hammer bar 20 in a position ready to strike said anvil bar 32; said electromagnet 18 and 19 being configured to release said hammer bar 20 and permit movement of said hammer bar 20 substantially parallel to the surface of the ground, on which said body 36 is to rest, and striking said anvil bar 32 in a direction substantially parallel to the surface of the ground on which said body 36 is to rest; a rod 22 connected to said hammer bar 20 being configured to permit said hammer bar 20 from being withdrawn from a position ready to release said hammer bar 20 to strike said anvil bar 32; said rod 30 comprising a hole 28 configured to receive a hook member 26 of said engaging device 22 and permit said engaging device 22 to pull said hammer bar 20 into the position ready to strike said anvil bar 32; releasing apparatus 18 and 19, comprising said electromagnet 18 and 19, being configured to release said hammer bar 20 to move and strike said anvil bar 32; a plate 34 attached to said body 36 configured to permit a portion of a vehicle, such as a truck tire, to hold said body 36 into firm contact with the ground and permit transfer of the generated wave from said body 36 into the ground upon said vehicle portion being disposed on said plate 34; and receiving apparatus for receiving reflections generated by the shear waves generated by said wave-generating unit 10 from fractures and other features in subsurface earth features; said method comprising the steps of: placing said body 36, by one person or two persons, on the ground permitting a direction of movement upon release of the hammer bar 20 substantially parallel to the surface of the ground, on which said body 36 is resting, where the distribution and orientation of fractures and other features are being determined; driving said vehicle portion onto said plate and holding and pressing said body 36 in firm contact with the ground on which said body 36 is located permitting transfer of the wave generated by said wave-generating unit 10 to the ground; pulling back said rod 22; compressing said coil spring 24 and moving said hammer bar 20 away from contact with said anvil bar 32 and into a position ready to strike said anvil bar 32; engaging said hook member 26 of said electromagnet 18 and 19 with said hole 28 of said engaging device 30 with said hook 26 in said rod 28 and holding said hammer bar 20 in a position to be held in place by the activated electromagnet 18 and 19 ready to strike said anvil bar 32; releasing said hammer bar 20 from said electromagnet 18 and 19 and moving said hammer bar 20 substantially parallel to the surface of the ground; striking said anvil bar 32 and generating a wave through said body 36 and generating a shear wave in the ground substantially parallel to the surface of the ground and into the ground substantially parallel to the surface of the ground on which said body 36 is placed; and receiving reflections generated by the shear waves generated by said wave-generating unit 10 from fractures and other features in subsurface earth features.

Still another feature or aspect of an exemplification is believed at the time of the filing of this patent application to possibly reside broadly in a shear wave generating arrangement 10 configured to generate shear waves according to the method of the present application, comprising: a compact, portable body 36 being sufficiently light to be transported by being carried by one person or two persons; handles 12 and 14 connected to said body 36 and being disposed to permit transport by one person or two persons; a hammer bar 20 disposed to strike an anvil bar 32 both being disposed in said body 36; said anvil bar 32, in said body 36, being disposed to be struck by said hammer bar 20; a coil spring 24 operatively connected to said hammer bar 20 and configured to move said hammer bar 20, in a direction substantially parallel to the surface of the ground on which said body 36 is to rest, to strike said anvil bar 32 and generate a shear wave substantially parallel to the surface of the ground on which said body 36 rests; an engaging device 30 configured to pull and compress said spring 24 and move said hammer bar 20 into a position ready to strike said anvil bar 32; holding apparatus 18 and 19 comprising an electromagnet configured to hold said hammer bar 20 in a position ready to strike said anvil bar 32; said electromagnet 18 and 19 being configured to release said hammer bar 20 and permit movement of said hammer bar 20 substantially parallel to the surface of the ground, on which said body 36 is to rest, and striking said anvil bar 32 in a direction substantially parallel to the surface of the ground on which said body 36 is to rest; a rod 22 connected to said hammer bar 20 being configured to permit said hammer bar 20 from being withdrawn from a position ready to release said hammer bar 20 to strike said anvil bar 32; said engaging device 30 comprising a hole 28 configured to receive a hook member 26 of said rod 22 and permit said engaging device 30 to pull said hammer bar 20 into the position ready to strike said anvil bar 32; said releasing apparatus 18 and 19, comprising said electromagnet, being configured to release said hammer bar 20 to move and strike said anvil bar 32; a plate 34 attached to said body 36 configured to permit a portion of a vehicle, such as a truck tire, to hold said body 36 into firm contact with the ground and permit transfer of the generated wave from said body 36 into the ground upon said vehicle portion being disposed on said plate 34; and receiving apparatus for receiving reflections generated by the shear waves generated by said wave-generating unit 10 from fractures and other features in subsurface earth features; said body 36 comprises: a plate 16 running under said hammer bar 20, said anvil bar 32, said spring 24, said electromagnet 18 and 19, and said rod 22 in operation; and said engaging device 30 comprising: a handle 38 configured to operatively compress said spring 24; and a releasing coil spring 40 arrangement configured to disengage said hole 28 from said hook member 26 upon said electromagnet 18 and 19 being deenergized from holding said hammer bar 20.

The components disclosed in the patents, patent applications, patent publications, and other documents disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, patent applications, patent publications, and other documents either incorporated by reference or not incorporated by reference.

The following patents, patent applications, patent publications, and patent documents are hereby incorporated herein, except for the exceptions indicated herein: U.S. Pat. No. 8,024,124, having inventor Colin Michael Sayers, published on Sep. 20, 2011; U.S. Pat. No. 8,225,666, having inventor Stephen McAleavey, published on Jul. 24, 2012; U.S. Pat. No. 8,976,625, having inventor Emanouil Blias, published on Mar. 10, 2015; U.S. Pat. No. 8,982,666, having first-named inventor Samik Sil, published on Mar. 17, 2015; U.S. Pat. No. 8,947,974, having first-named inventor Radu Coman, published on Feb. 3, 2015; U.S. Pat. No. 5,587,968, having inventor Frederick J. Barr, published on Dec. 24, 1996; U.S. Pat. No. 5,142,501, having inventor Donald F. Winterstein, published on Aug. 25, 1992; and U.S. Pat. No. 8,982,671, having first-named inventor Mark Elliott Willis, published on Mar. 17, 2015.

The following patents, patent applications, patent publications, and patent documents are hereby incorporated herein, except for the exceptions indicated herein: U.S. Pat. No. 8,061,471, having the title "SEISMIC VIBRATOR CONTROLLED BY DIRECTLY DETECTING BASE PLATE MOTION", issued on Nov. 22, 2011; U.S. Pat. No. 7,395,897, having the title "ACCELERATED WEIGHT DROP CONFIGURABLE FOR USE AS A SHEAR WAVE SEISMIC ENERGY SOURCE AND A METHOD OF OPERATION THEREOF", issued on Jul. 8, 2008; U.S. Pat. No. 4,980,874, having the title "METHOD AND APPARATUS FOR MAXIMIZING SEISMIC SHEAR WAVE PRODUCTION", issued on Dec. 25, 1990; U.S. Pat. No. 6,065,562, having the title "SYSTEM FOR IMPARTING COMPRESSIONAL AND SHEAR WAVES INTO EARTH", issued on May 23, 2000; U.S. Pat. No. 7,590,491, having the title "SIGNAL INTEGRATION MEASURE FOR SEISMIC DATA", issued on Sep. 15, 2009; U.S. Patent Application No. 2014/0334262, having the title "METHOD AND APPARATUS FOR ACTIVE SEISMIC SHEAR WAVE MONITORING OF HYDRO-FRACTURING OF OIL AND GAS RESERVOIRS USING ARRAYS OF MULTI-COMPONENT SENSORS AND CONTROLLED SEISMIC SOURCES", published on Nov. 13, 2014; and article in the *Canadian Geotechnical Journal*, 1994, 31(1): 119-124, 10.1139/t94-013, entitled "Sample disturbance from shear wave velocity measurements", authored by S. Sasitharan, P. K. Robertson, and D. C. Sego.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the embodiments therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, patent publications, and other documents, are not considered to be incorporated by reference herein for any of the patents, patent applications, patent publications, and other documents cited herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A unit configured to generate shear waves through the ground, to determine orientation of geologic subsurface earth features using said wave-generating unit, said unit comprising:
    a compact, portable body being sufficiently light to be transported by being carried by one person or two persons;
    handles connected to said body and being disposed to permit transport by one person or two persons;
    a hammer bar disposed to strike an anvil bar both being disposed in said body;
    a rod connected to a center portion of said hammer bar;
    said anvil bar, in said body, being disposed to be struck by said hammer bar;
    a coil spring disposed about said rod;
    said coil spring operatively connected to said hammer bar and configured to move said hammer bar, in a direction substantially parallel to the surface of the ground on which said body is to rest, to strike said anvil bar and generate a shear wave substantially parallel to the surface of the ground on which said body rests;
    an engaging device configured to engage with said rod and pull said rod and compress said spring and move said hammer bar into a position ready to strike said anvil bar;
    a handle operatively connected to said engaging device and configured to move a said engaging device and said hammer bar into a position ready to strike said anvil bar;
    holding apparatus comprising electromagnets disposed to hold said hammer bar in a position ready to strike said anvil bar upon activation of said electromagnets;
    said electromagnets being disposed on either side of said rod;
    a switch, configured to activate and deactivate said electromagnets to hold and release said hammer bar and permit movement of said hammer bar substantially parallel to the surface of the ground, on which said body is to rest, and striking said anvil bar; and
    a plate attached to said body configured to permit a portion of a vehicle, such as a truck tire, to hold said body into firm contact with the ground and permit transfer of the generated energy from said body into the ground upon said vehicle portion being disposed on said plate.

2. The wave-generating unit according to claim 1 wherein said engaging device comprises a hook member and a hole member configured to engage one another prior to movement of said hammer bar and disengage upon said hammer bar being in a position to strike said anvil bar.

3. The wave-generating unit according to claim 2, wherein the electromagnets comprise two electromagnets, each disposed on an opposite side of said rod.

4. The wave generating unit according to claim 3, wherein said handle comprises a long handle connected to said engaging device to pull said rod and to compress said spring into said position to strike said anvil bar.

5. The wave generating unit according to claim 4, wherein the electromagnets comprise two electromagnets, each disposed on an opposite side of said rod.

6. The wave generating unit according to claim 1, wherein said handle comprises a long handle connected to said engaging device to pull said rod and to compress said spring into said position to strike said anvil bar.

7. The wave generating unit according to claim 2, wherein the electromagnets comprise two electromagnets, each disposed on an opposite side of said rod.

8. The wave generating unit according to claim 4, wherein the electromagnets comprise two electromagnets, each disposed on an opposite side of said rod.

* * * * *